United States Patent

Fromm et al.

[11] Patent Number: 5,821,696
[45] Date of Patent: Oct. 13, 1998

[54] METHOD AND CIRCUIT TO START AND OPERATE HIGH PRESSURE DISCHARGE LAMPS

[75] Inventors: Dietrich Fromm, Warngau; Joachim Arlt, Guardinistr, both of Germany

[73] Assignee: Patent-Treuhand Gesellschaft F. Elektrische Gluehlampen mbH, Munich, Germany

[21] Appl. No.: 565,077

[22] Filed: Nov. 30, 1995

[30] Foreign Application Priority Data

Dec. 2, 1994 [DE] Germany .......................... 44 42 898.7

[51] Int. Cl.$^6$ ...................................................... H05B 39/04
[52] U.S. Cl. ........................ 315/107; 315/225; 315/160; 315/172; 315/360; 315/DIG. 2; 315/DIG. 5
[58] Field of Search .................................. 315/225, 224, 315/219, 287, 290, 291, 307, 308, 360, DIG. 2, DIG. 5, DIG. 7, 209 R, 106, 107, 160, 172, 175

[56] References Cited

U.S. PATENT DOCUMENTS

| 4,291,254 | 9/1981 | Arlt et al. | 315/240 |
| 4,331,905 | 5/1982 | Owen | 315/225 |
| 4,378,514 | 3/1983 | Colllins | 315/276 |
| 4,749,914 | 6/1988 | Feher et al. | 315/246 |
| 5,036,256 | 7/1991 | Garrison et al. | 315/308 |
| 5,262,699 | 11/1993 | Sun et al. | 315/209 R |

FOREIGN PATENT DOCUMENTS

| A-0411617 | 2/1991 | European Pat. Off. . |
| A-2034104 | 12/1970 | France . |
| A-2489069 | 2/1982 | France . |
| 42 27 427 C2 | 2/1994 | Germany . |

*Primary Examiner*—Robert Pascal
*Assistant Examiner*—Haissa Philogene
*Attorney, Agent, or Firm*—Frishauf, Holtz, Goodman, Langer & Chick, P.C.

[57] ABSTRACT

Start and operation of high pressure discharge lamps, in which a high-frequency starting voltage $U_{HF}$ and an operating voltage $U_B$ are furnished to the lamp electrodes includes the steps of: 1) turning on the high-frequency starting voltage $U_{HF}$ at a starting time $t_0$ to ionize the lamp filling and preheat the electrodes; 2) turning on the operating voltage $U_B$ after a preheating interval $\Delta t_H$, that is, at time $t_1 = t_0 + \Delta t_H$; and 3) turning off the starting voltage $U_{HF}$ at time $t_2 \geq t_1$, as a result of which the lamp is then operated solely by means of the operating voltage $U_B$. As a result, the transfer phase for the development of the arc is shortened. Advantageously, the frequency of the starting voltage is selected such that the product of the frequency f of the starting voltage $U_{HF}$ and the spacing d between the electrodes meets the condition $f \cdot d \geq 50$ kHz·cm. A circuit arrangement for carrying out this method includes an HF ignition device and an operating device, which are each connected to the electrodes of the lamp via a respective switch, and the two switches are actuated by means of timers.

21 Claims, 5 Drawing Sheets

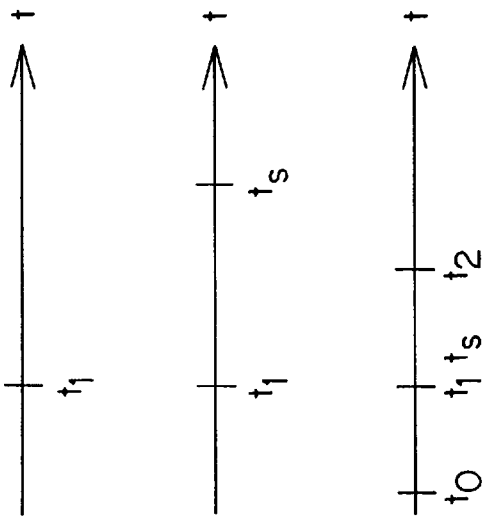
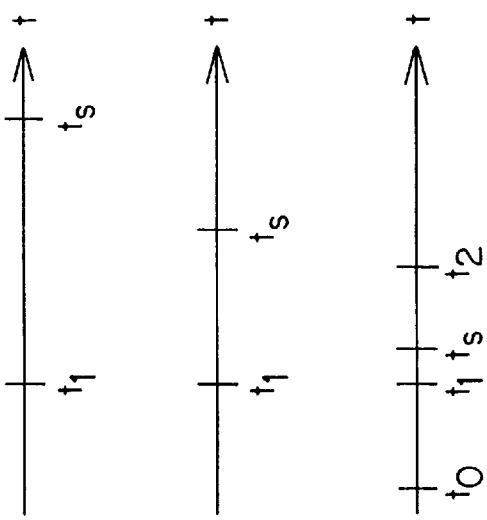
FIG. 2A (PRIOR ART)
FIG. 2B (PRIOR ART)
FIG. 2C

1

METHOD AND CIRCUIT TO START AND OPERATE HIGH PRESSURE DISCHARGE LAMPS

FIELD OF THE INVENTION

The invention relates to a technique for starting and operating high pressure discharge lamps and, in particular, to shorten the transfer phase for developing the arc discharge.

BACKGROUND OF THE INVENTION

The term high pressure discharge lamps applies to lamps that have at least two main electrodes, located inside a discharge vessel (i.e. bulb), between which a high current arc discharge develops during operation. Examples of such lamps are metal halide, sodium vapor, and noble gas arc lamps. During the ignition phase, the gas within the lamp is ionized between the electrodes so as to change the electrical conductivity of the gas from nonconducting to conducting, and the lamp current rises rapidly.

To ignite the gas filling the lamp, high-voltage pulses are typically applied to the lamp electrodes as described, for example, in German Patent Disclosure DE-OS 42 27 427. The resultant electrical field created between the electrodes accelerates the free primary electrons, which are generated by the ionizing ambient radiation (such as cosmic radiation) and by field emission, in order to release new secondary electrons from the electrode surfaces by charge carrier bombardment and, thus, to start a charge carrier avalanche.

The electrodes are heated up to an increasing extent by the charge carrier bombardment. As the temperature rises, the thermionic emission of the electrodes gains significance as a source for generating free electrons. Consequently, the ionization of the gas in the lamp filling the space between the electrodes increases still further until, with high enough conductivity, a stable arc discharge develops. The period of time between ionization of the gas and the development of the arc discharge, which "takes over" from the initial glow discharge, is also known as the transfer phase. Another way of defining the transfer phase is that it begins when the operating voltage is applied to the electrodes and ends when the arc is fully developed.

The transfer phase is as a rule followed by a run-up phase, during which the lamp heats up to its steady-state operating temperature. Not until the conclusion of this run-up phase does the operating voltage at the lamp electrodes adjust to a steady-state value for the arc burning voltage. The hot electrodes produce, by thermionic emission, a sufficient number of free electrons for maintaining the arc discharge It is often necessary to reinforce the ignition by adding radioactive substances. Among other effects, the ionizing radiation emitted by these substances increases the density of the primary electrons and, thus, promotes the development of a charge carrier avalanche between the electrodes. To that end, the β- emitter krypton-85, for instance, can be added to the lamp filling. Another provision is to dope the electrodes with thorium (an α-emitter); moreover this reduces the electron work function. However, it is preferable to avoid using radioactive additives.

U.S. Pat. No. 4,331,905, issued to Owen, discloses a circuit arrangement for starting and operating gas discharge lamps. Besides a ballast device for lamp operation, it also contains a high-frequency circuit which furnishes a high starting voltage for starting cold lamps or re-starting hot lamps. In accordance with the mode of operation of this circuit arrangement, both the operating voltage of the ballast device and the high-frequency starting voltage are applied to the lamp electrodes during the ignition phase. Once a stable arc discharge develops and the lamp reaches its normal operation state, the high-frequency starting voltage is turned off.

FIGS. 2A and 2B show a lamp start operation with the above-mentioned prior art technique. Two 70 W metal halide discharge lamps (identified as Lamp 1 and Lamp 2) with nonthoriated electrodes and with an ignition gas pressure of about 130 hPa (argon) were used to show a schematic (not to scale) comparison of the lengths of the lamp starting phases. To this end, the respective times $t_1$ for turning on the operating voltage $U_B$, and $t_S$ for the full development of the arc—that is, the end of the transfer phase—are plotted on time axes t. The times marked are from oscillographic recordings of the particular electrode voltage taken over time. The voltage jump to the arc burning voltage was selected to define the time $t_S$.

FIG. 2A shows what results from use of an inductive accessory or ballast device including a conventional ignition circuit in accordance with the disclosure of DE-OS 42 27 427. At time $t_1$, a mains voltage (which is applied as operating voltage $U_B$) and a train of high-voltage pulses $U_P$, persisting until arc transfer occurs at $t_S$, were applied to the lamp electrodes. After about 2.7 seconds—at the time mark $t_S$—the arc of the Lamp 1 had fully developed. The Lamp 2, on the other hand, could not be ignited.

FIG. 2B shows what results from using the technique disclosed in U.S. Pat. No. 4,331,905. At time t, the mains voltage (which is applied as operating voltage $U_B$) and a high-frequency starting voltage $U_{HF}$ were applied to the lamp electrodes simultaneously. The length of time $t_S$–$t_1$ until the end of the transfer phase was about 0.9 sec for Lamp 1 and about 1.3 sec for Lamp 2. During this period of time, both lamps exhibited pronounced flickering.

A disadvantage of the above-described approaches is that particularly during the ignition phase, but also during the transfer phase, both local overheating and sputtering occur as a result of field emission because of the high electrical ignition field intensities—which are pulselike, for example—at the electrode surfaces. While the electrodes are still cold, particles are loosened from these surfaces because of, among other reasons, charge carriers bombarding the electrode surfaces. As a result, each time the lamp is started, electrode material is sputtered, some of which settles on the inner wall of the discharge vessel. This leads to progressive blackening of the bulb and, consequently, to a reduction in the light yield of the lamp. Moreover, the starting voltage serves essentially only to ignite an auxiliary glow discharge with a relatively low energy conversion. The requisite heating energy for attaining the thermionic temperature of the electrodes and for development of the arc discharge—that is, the actual main discharge—is not generated by the operating voltage until some time during the transfer phase. As a result, the transfer phase lasts a relatively long time and, thus, it too contributes to the sputtering of electrode material and, consequently, to blackening of the bulb.

SUMMARY OF THE INVENTION

One object of the present invention is to overcome the disadvantages discussed above for starting and operating discharge lamps by shortening the transfer phase for the development of the arc discharge.

Another object of the present invention is to assure reliable ignition of the arc discharge with the lowest possible ignition voltage, and without using radioactive additives in the lamp.

Briefly, in accordance with one aspect of the invention, a method is provided for starting and operating a high pressure discharge lamp with a discharge vessel containing an ionizable gas and in which at least two electrodes are included. At the electrodes, via power supply leads extended to the outside in a gas tight manner, a high-frequency starting voltage $U_{HF}$ and an operating voltage $U_B$ are produced. The high-frequency starting voltage $U_{HF}$ is turned on at starting time $t_0$ to ionize the gas and preheat the electrodes. The operating voltage $U_B$ is turned on at time $t_1=t_0+\Delta t_H$, after an interval $\Delta t_H$.

According to another aspect of the invention, an apparatus includes an operating device, connected to a first switch, and an HF ignition device, connected to a second switch, as well as a timer that controls both switches. Both the output of the operating device that furnishes the operating voltage and the output of the HF ignition device that furnishes the high-frequency starting voltage are connected to the lamp electrodes in accordance with the timing program of the timer. A barrier member, such as a choke, decouples the high frequency starting voltage from the output of the operating device.

In one version, the HF ignition device comprises an HF power oscillator for generating the high frequency starting voltage and a following resonant circuit, for instance a series circuit of a capacitor and a coil, which increases the amplitude of the high frequency starting voltage to the requisite high voltage.

The advantage of this superposition technique is that conventional ignition devices in existing accessory or ballast systems are easily and economically replaced with the HF superposition ignition device, including switches and timers.

The invention will be described in further detail in terms of several exemplary embodiments in conjunction with the following drawings.

BRIEF DESCRIPTION OF THE DRAWINGS

FIGS. 2A and 2B show a lamp start operation carried out by prior art techniques, whereas FIG. 2C shows a lamp start operation carried out in accordance with the invention.

DETAILED DESCRIPTION OF THE INVENTION

Figure 1:
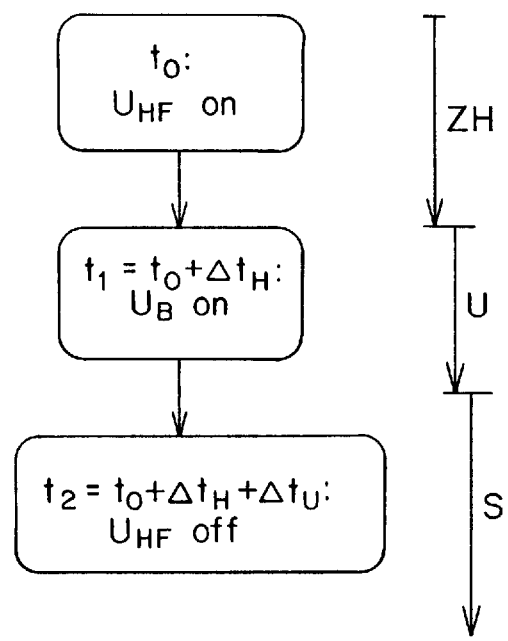
FIG. 1 is a flow chart for starting and operating discharge lamps in accordance with the invention.

A broad explanation of the invention will now be presented, followed by a discussion related more specifically to the drawings. A high-frequency alternating voltage—called the starting voltage $U_{HF}$—is applied to the lamp electrodes. It is specifically selected so as to create an ignition-and-preheating phase during which free electrons are produced by impact ionization of the gas particles, essentially only in the space between the electrodes. In contrast to known ignition techniques, the secondary electron emission on the surface of the still-cold electrodes plays no role here at first. A further important feature is that by means of the high-frequency electrical field generated by the starting voltage $U_{HF}$, a high-frequency (HF) power which is adequately high for rapid heating up of the electrodes is furnished. In accordance with a particularly significant feature of the invention, the operating voltage for the lamp is not applied (i.e., to start the transfer phase) to the electrodes until after this ignition-and-preheating phase. By then, the electrodes have been heated to thermionic temperature, and are thus in a position to furnish an adequate number of electrons, by thermionic emission, for quickly producing the high-current arc discharge (i.e., to end the transfer phase).

In comparison with known methods, as described above, this approach markedly shortens the transfer phase. There is also an attendant lessening of the above-described sputtering that occurs at the electrode surfaces as the lamp is started. The resultant decisive advantage is reduced blackening of the bulb and, hence, better lamp maintenance and/or longer lamp life.

This advantage is reinforced by another feature which is also a direct consequence of the ignition technique according to the invention. Surprisingly, the cold lamp filling pressure can in fact be raised markedly compared with earlier ignition techniques and, consequently, the sputtering of electrode material during the ignition phase can be reduced still further. In a 70 W metal halide lamp, for instance, the argon partial pressure, which is typically about 150 hPa, can be increased to over 300 hPa, while preserving a short transfer time. In sodium vapor lamps, an increased xenon partial pressure not only results in better maintenance but has still another welcome significance, namely that per hPa of pressure increase, an increase in the light flux of approximately 2 lumens (lm) can be attained. In a 70 W sodium vapor lamp, for example, ignitions and arc transfers have been attained at xenon partial pressures of up to 500 hPa. Given a typical xenon partial pressure of 250 hPa in earlier lamps, this means an increase in the light flux of approximately 500 lm.

It has additionally been demonstrated that lamps with relatively long ignition and transfer times, such as lamps with nonthoriated electrodes and without the addition of krypton, and in fact surprisingly even lamps that cannot (or can no longer) be ignited by conventional ignition techniques can, with the aid of the invention, be ignited within a short time and can then burn reliably.

For the operating voltage, direct voltage or alternating voltage is used—depending on the requirements of the lamp to be operated. For operation with an alternating voltage, mains frequency (60 or 50 Hz) and frequencies of several tens of kilohertz, as are usual for an electronic accessory, or ballast, or starting circuits, are of practical significance. The amplitude of the operating voltage at the electrodes is equivalent—after the transfer phase—to the burning voltage of the discharge arc. Typical (effective) values are on the order of magnitude of between about 10 and 100 volts. If the invention is employed in low-voltage networks, such as automotive on-board electrical systems, then the voltage must as usual be raised with the aid of a DC—DC converter.

FIG. 1 shows a basic flow chart for carrying out the invention. At the starting time $t_0$, the starting voltage $U_{HF}$ is applied to the electrodes of the discharge lamp. This begins the ignition-and-preheating phase, identified by ZH, during which the high-frequency electrical field produced by starting voltage $U_{HF}$ establishes electron flow between the electrodes, and the electrodes are heated to thermionic temperature. After an interval of $\Delta t_H$, or in other words at time $t_1=t_0+\Delta t_H$, the operating voltage $U_B$ is turned on as well to begin the transfer phase U. As a result, an arc discharge soon develops between the electrodes, which are already capable of thermionic emission, and this ends the transfer phase U. After an overlap interval $\Delta t_U = t_2 - t_1$, or in other words at a time $t_2 = t_1 + \Delta t_U = t_0 + \Delta t_H + \Delta t_U$, the starting voltage $U_{HF}$ is turned off. This concludes the starting operation for the lamp which, after a run-up phase, changes over to its steady-state or stable operating mode S.

FIG. 2C provides a comparison of lamp start operation according to the invention with the prior art lamp start operations described above in connection with FIGS. 2A and 2B. In FIG. 2C the high-frequency starting voltage $U_{HF}$ is applied to the lamp electrodes at time $t_0 < t_1$, or in other words prior to the switching ON of the operating voltage $U_B$. In this way, the electrodes are preheated during the time interval $\Delta t_H = t_1 - t_0$ of the ignition-and-preheating phase ZH. As a result, the time duration $t_S - t_1$ of the transfer phase is decreased for both Lamp 1 and Lamp 2 to about 0.1 sec. which compares very favorably with the 0.9 to 2.7 seconds for lamps started per FIGS. 2A and 2B. Moreover, the arc attaches to the electrode tips immediately after operating voltage $U_B$ is applied and, therefore, no flickering occurs. The operating parameters employed in connection with FIG. 2C are summarized in the following table.

TABLE

PARAMETERS FOR STARTING AND OPERATING A 70 W
METAL HALIDE DISCHARGE LAMP BY THE METHOD OF FIG. 2C.

| Starting Voltage: | Amplitude $U^S_{HF}$ (peak) | 2.5 kV |
| | Frequency | 150 kHz |
| | HF power | 35 W |
| Operating Voltage: | Amplitude $U^{eff}_B$ (effective) | 90 V |
| (stable lamp | Frequency | 50 Hz |
| burning voltage) | operating power | 70 W |
| Durations: | Ignition and Preheating interval $\Delta t_H$ | 1 sec |
| | Overlap interval $\Delta t_U$ | 0.3 sec |

The appropriate durations for intervals $\Delta t_H$ and $\Delta t_U$ differ with, for example, lamp type (e.g. electrodes, gas type and pressure) and electrical parameters (e.g. magnitude and frequency of $U_{HF}$). These interval durations are determined experimentally and need not be treated as requiring critical accuracy because, to be on the safe side, the durations can be set to be longer than needed. Thus, $\Delta t_H$ depends, for example, on the level of HF power supplied to the electrodes. $\Delta t_U$ is set to make sure that the operating voltage $U_B$ is able to support the arc by itself without flicker or other deteriorating effects. This can be achieved if $t_S$ occurs well within interval $\Delta t_U$.

It has proved to be advantageous to select a frequency for the starting voltage specifically such that the product of the frequency f of the starting voltage and the electrode spacing d meets the condition f·d ≧ 50 kHz·cm. At the present time, it is assumed that the oscillation amplitude of the electrodes and certainly of the heavier ions is then low enough to keep losses from oscillatory drift to the electrode surfaces, and undesirable electrode effects associated with a charge carrier bombardment slight during the ignition phase, for the majority of the charge carriers.

On the other hand, coupling-in and line losses generally rise as the frequency increases. In view of this additional aspect, with conventional HF excitation techniques based on the oscillator-amplifier principle, frequencies in the range between about 100 kHz and 200 kHz have proved to be usable. One example of an oscillator amplifier is disclosed by oscillator 22 and driver 24 depicted in WO 92/12611 A1 (corresponding to U.S. Ser. No. 07/639,816) which is hereby incorporated by reference. The oscillator generates the required frequency at low power, and the amplifier supplies the required power at such frequency. Moreover, to avoid unnecessarily long power leads, it is advantageous for the device that generates the high-frequency starting energy to be located as close as possible to the lamp. With suitable excitation concepts, such as by the principle of the self-excited generator, or autodyne, however, it is also possible to couple even higher frequency HF energies into the discharge with low losses. Such a generator does not employ a separate oscillator and amplifier. Instead, the generator produces a frequency with the required power.

The ignition of the lamp takes place when a sufficiently high HF field intensity $E_{HF} = U_{HF}/d$ is reached, with $U_{HF}$ being the starting voltage between the electrodes that are spaced from each other by d. Suitable peak values for the $E_{HF}$ are in the range between approximately 1 kV/cm and 6 kV/cm, and preferably between 2.5 kV/cm and 4.5 kV/cm. To attain optimal results even given the varying fill pressures of the ignition gases of commercially available lamps, it is advantageous to take into account the value of $E_{HF}$ referred to the fill pressure p or, in other words, $E_{HF}/p$.

The HF ignition of cold lamps is easily achieved with the aforementioned field intensities and frequencies. For the usual inert gas fill pressures of arc discharge lamps on the order of magnitude of up to several tens of kPa (1 kPa=10 hPa), pressure-referred peak field intensities $E^S_{HF}/p$ are in the range of about 0.1 V/cm·Pa to 0.5 V/cm·Pa. In hot lamps, because of the high pressure (typically 100 kPa and higher) and possibly because of the presence of filling components with an affinity for electrons, such as halides, ignition voltages of typically 10 kV and higher can be necessary. For this reason, for hot ignition a step known per se, in which one or more high-voltage pulses suitable for ionization are applied to the electrodes of the discharge vessel, should be employed beforehand. As a rule, because of the sometimes very high voltage values, this requires a special high-voltage ignition device.

In a specific example of the method, the peak value of the starting voltage $U^S_{HF}$ is in the range between approximately 1.5 kV and 3.5 kV, and preferably in the range between approximately 2 kV and 3 kV.

The length of the transfer phase is dependent essentially on the efficiency of the thermionic emission of the electrodes. It can consequently be influenced in a desired way by means of the preheating energy for the electrodes, or in other words the high-frequency starting power, and by means of the length of the preheating phase. For sufficiently rapid heating up of the electrodes to thermionic temperature, the mean high-frequency starting power is approximately 0.2 to 0.7, and preferably 0.3 to 0.6, times the operating power.

Taking into account the above-described parameter ranges for the frequency and amplitude of the starting voltage and for the high-frequency starting power, the principle of the invention can be described by the following features:

1. Turning on the high-frequency starting voltage at the starting time $t_0$.

2. Turning on the operating voltage at time $t_1 = t_0 + \Delta t_H$.

The invention also has been described above in terms of turning off the starting voltage at time $$t_2 = t_1 + \Delta t_0 = t_0 + \Delta t_H \Delta t_U.$$

However, the basic aim and significant advantages of the invention do not require that $U_{HF}$ be switched off.

Nevertheless, it is preferable to do so in order to avoid the necessity to make the HF circuit more expensive so it could handle the unavoidable power losses.

The preheating time $\Delta t_H$ depends on the level of the mean high-frequency starting power, and can range up to about 3 seconds. Typically it is in the range between 0.1 sec and 1.5 sec. By that time, the electrodes are already white-hot. Without intending to settle on any one theoretical explanation, it is currently thought that not only electron impacts but also eddy currents and the skin effect are involved in the heating process. Since, in contrast to the prior art, the electrodes have already attained thermionic temperature when the operating voltage is turned on, the arc discharge develops rapidly. If the starting and operating voltages are turned on simultaneously (i.e. $\Delta t_H=0$), the transfer phase is conversely sometimes notably lengthened. After an overlap time $\Delta t_U$, during which both the starting voltage and the operating voltage are on, the starting voltage $U_{HF}$ is switched off and the arc discharge is supplied with energy by the operating voltage $U_B$ alone. The overlap time $\Delta t_U$ is typically in the range from about 0.1 sec to 0.5 sec.

Figure 3:
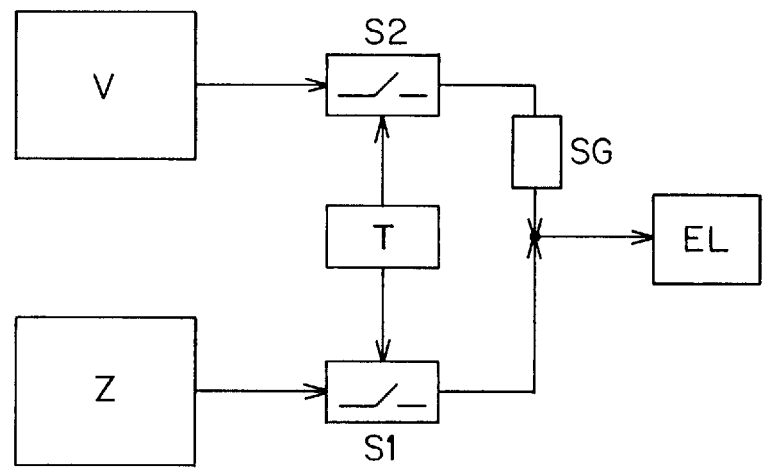
FIG. 3 is a block diagram of a circuit arranged in accordance with the invention.

FIG. 3 shows a block diagram of a basic circuit arrangement for carrying out the method of FIG. 1. An operating device V furnishes the operating voltage $U_B$, an HF ignition device Z generates the high-frequency starting voltage $U_{HF}$, and two switches S1 and S2 that are controlled by a timer T and are connected to the HF ignition device Z and the device V, respectively. Both the operating device V and the HF ignition device Z are connected to the discharge lamp EL. A high frequency barrier member SG between the operating device V and the HF ignition device Z prevents the coupling of the starting voltage $U_{HF}$ into the operating device V during the overlap phase.

Figure 4:
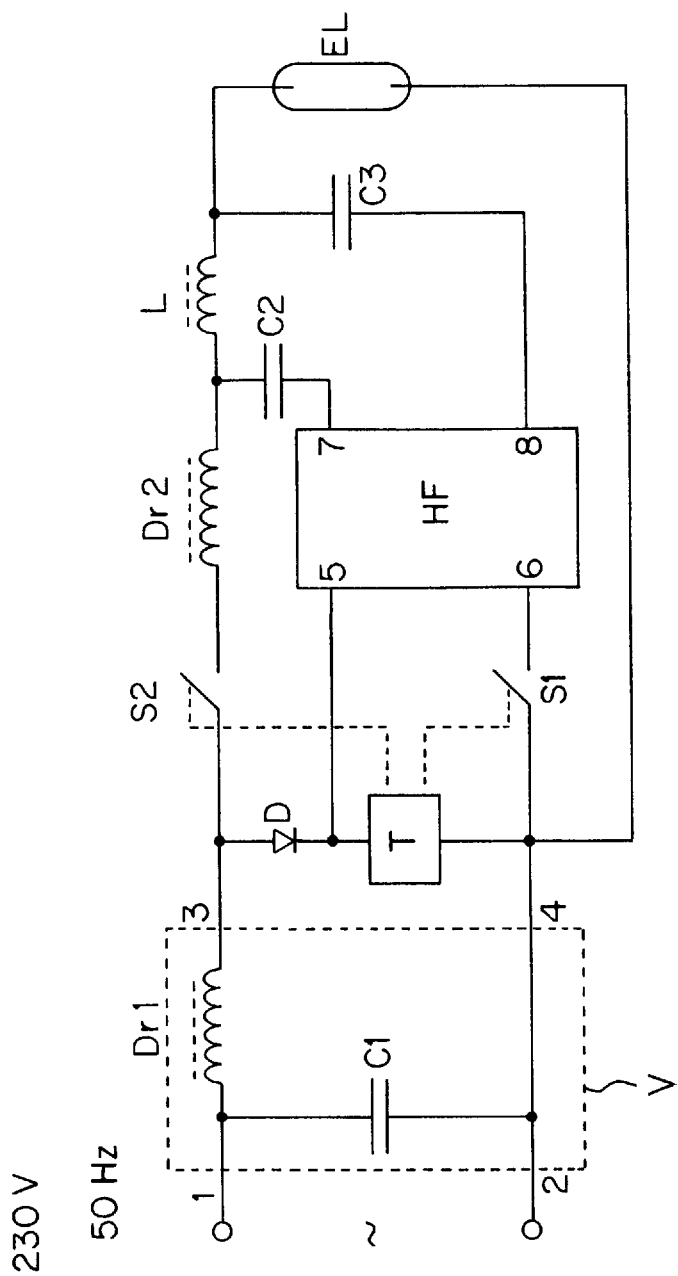
FIG. 4 is a more detailed version of the block diagram of FIG. 3.

FIG. 4 shows a more detailed version of the circuit arrangement of FIG. 3. It includes a conventional inductive accessory or ballast device V, operated with a 230 V, 50 Hz mains voltage; a power oscillator HF, known per se, which generates a high-frequency voltage and which, with the series resonant circuit comprising a coil L and capacitor C3, forms an HF superposition ignition device; and two switches S1, S2, controlled by means of a timer circuit T known per se. One example of timer T (not shown) utilizes a capacitor C, which is connected to a comparator and charged via a resistor R. The comparator compares the voltage of the capacitor with a predetermined voltage. When the voltage of the capacitor is equal to the predetermined voltage, the comparator triggers a switch (for instance a transistor or the like). The timer can be adjusted by adjusting the capacitance and/or resistance (because this controls the time constant $t=R \cdot C$ of the RC circuit).

The device V comprises a serial accessory or ballast choke Dr1 for limiting the lamp current, and a compensating capacitor Cl, connected in parallel to the input terminals 1, 2, for improving the power factor. The two input terminals 1, 2 of the device V are connected to the mains voltage. The timer circuit T is supplied from the output terminals 3, 4 of the device V. To that end, the timer circuit T is connected on the one hand via a diode D to the ballast choke Dr1 and on the other to the base point of the compensating capacitor Cl. The input terminals 5, 6 of the power oscillator HF are supplied in a similar way. To that end, a first input terminal 5 of the power oscillator HF is connected to the junction between the diode D and the timer circuit T. The second input terminal 6 of the power oscillator HF is connected to the base point of the compensating capacitor Cl via a first switch S1, such as a semiconductor switch. The capacitor C3 connects a first output terminal 8 of the power oscillator HF to the first electrode of the discharge lamp EL. Together with the coil L, the capacitor C3 forms a series resonant circuit which, by means of raising the resonance, furnishes the electrodes of the lamp EL with the requisite amplitude of the high-frequency starting voltage $U_{HF}$ for igniting the lamp filling. At time $t_0$, switch S1, by closing the circuit between power oscillator HF and the mains voltage, turns on the power oscillator HF to provide starting voltage $U_{HF}$ for the duration of the ignition and preheating phase ZH plus the overlap phase U.

The junction between the ballast choke Dr1 and the diode D is connected via a second switch S2; such as a mechanical relay, and via a choke Dr2 and a coil L to the first electrode of the discharge lamp EL. The second electrode of the discharge lamp EL is connected to the base point of the compensating capacitor Cl. At time $t_1$, the switch S2 connects the device V with the discharge lamp EL. The choke Dr2 acts as the high frequency barrier SG between the output of the power oscillator HF and the ballast choke Dr1 of the device V. The junction between the choke Dr2 and the coil L is connected via a coupling capacitor C2 to the second output terminal 7 of the power oscillator HF. Capacitor C2 couples the HF current into the series resonant circuit, on the one hand, and separates the mains voltage from the HF portion, on the other.

The advantage of this arrangement is the capability it provides for unproblematic replacement of conventional ignition devices with the HF ignition device of the invention, including its associated switches S1, S2 and timer T.

Figure 5:
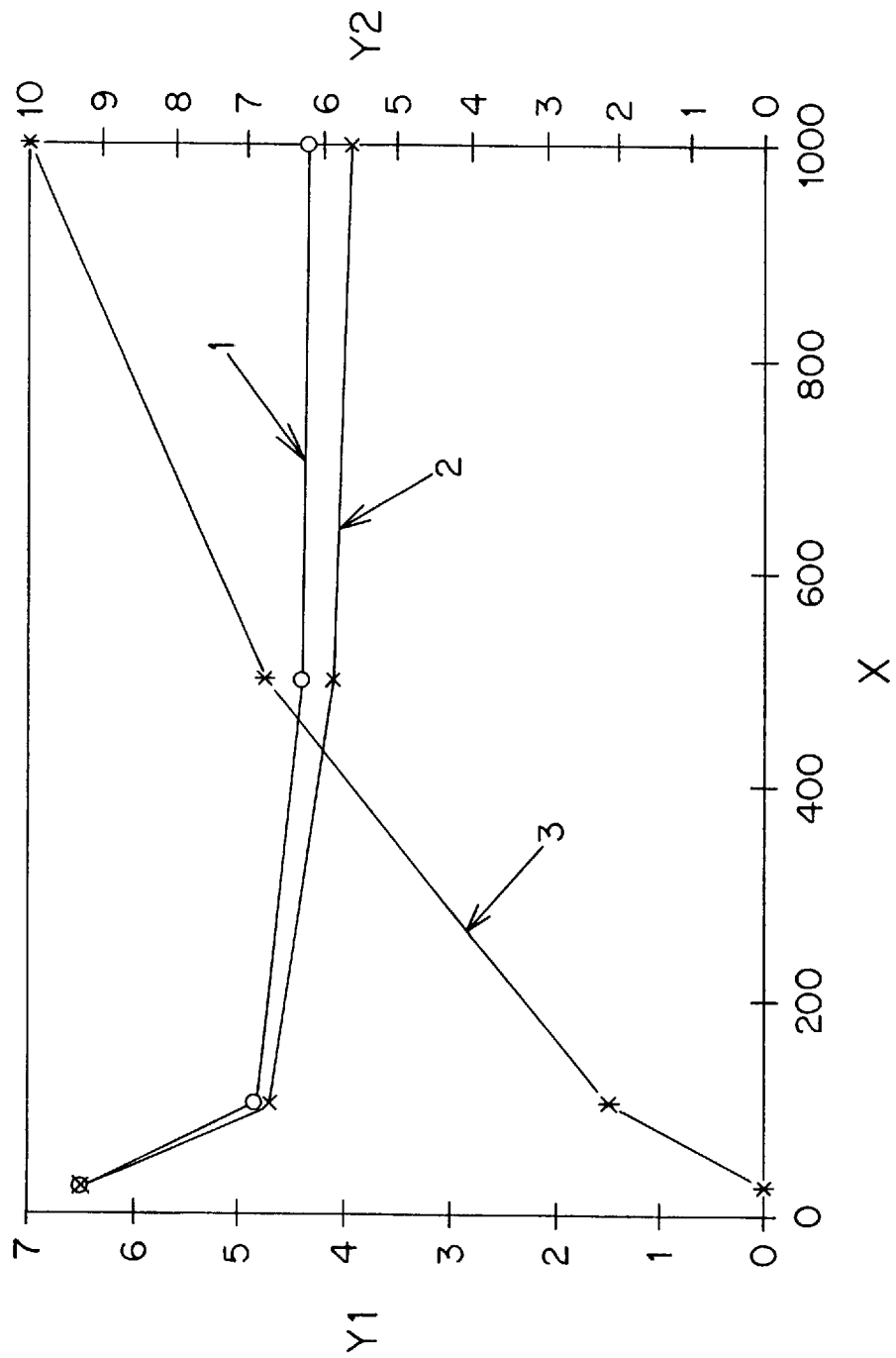
FIG. 5 is a graph which provides a comparison of measured light fluxes for lamps started in accordance with the invention (curve 1) and lamps started in accordance with the prior art (curve 2), along with the corresponding percentage of improvement in light flux (curve 3).

In FIG. 5, a comparison is shown between measured light fluxes (along the Y1 axis) as a function of the cumulative number of ignitions (along the X axis) for lamps with the HF ignition device (curve 1) of the present invention and a conventional ignition device (curve 2). The cumulative number was arrived at by turning the lamps on and off once per hour of operation. This means that in this case the number of switching events (values on the X axis) is equivalent to the length of operation in hours. The Y1 coordinates indicate the light flux of the lamps in kilolumens (klm) for the number of ignitions that have taken place by the time that particular light flux was measured. The measurements were made with 70 W metal halide discharge lamps having thoriated electrodes but without the addition of Kr-85. In the case of the HF ignition device, the operational parameters shown above in the Table were used.

It is clear from FIG. 5 that as the number of ignitions increases, the light flux of the mode of operation according to the invention (curve 1) drops off less than in the conventional mode of operation (curve 2). The improved operation due to the invention is especially apparent from curve 3, which shows (along the Y2 axis) the percentage of improvement in light flux in the lamps operated according to the invention, compared with conventionally operated lamps. This improvement increases steadily with the number of ignitions within the scope of the measurements, and after 1000 ignitions is already virtually 10%.

It should be understood that while specific embodiments of the present invention have been described in detail above, various changes thereto will be readily apparent to one with ordinary skill in the art. For example, the high-frequency starting voltage can in principle be steady-state operation of the lamp as well. However, this is not currently thought to have any advantages.

In one version of the invention, the length of the overlap time $\Delta t_U$ is variably adapted to the transfer phase of the particular lamp. In that case the end of the overlap time $\Delta t_U$ is derived from the voltage jump at the lamp electrodes from the idling supply voltage to the arc discharge operating voltage. If the lamps are defective or absent, then the starting voltage is switched off a few seconds, for instance 5 sec, after the usual transfer phase of conventional discharge lamps has elapsed.

In a simplified version of the invention, the overlap time is fixedly predetermined. The length of the preheating time, typically about 0.5 sec, and the high-frequency heating power, which is typically about half the operating power, are selected such that the arc transfer takes place very quickly, typically within about 0.1 sec to 0.2 sec, once the operating voltage is also switched on. By an overlap time that is slightly longer than the transfer time, for instance $\Delta t_U = 0.3$ sec, it is assured that the arc will have developed before the starting voltage $U_{HF}$ is turned off.

In principle, an overlap can also be dispensed with (i.e., $\Delta t_U = 0$); that is, the starting voltage is turned off and the operating voltage is turned on synchronously. However, this variant of the invention is achieved at the cost of additional expense for control purposes. In order as much as possible to prevent cancellation of the discharge over a relatively long period of time (on the order of magnitude of milliseconds and longer) during the arc transfer, and thus to prevent cooling down of the electrodes, it must be assured that the starting voltage is not turned off until the moment at which the operating voltage is applied to the lamp electrodes. The version that is simplest in practical terms, however, remains adding the operating voltage to the starting voltage after the preheating time, and turning off the starting voltage only after an overlap time.

All such changes are intended to fall within the scope of the present invention as defined by the following claims.

We claim:

1. A method for starting and operating a high pressure discharge lamp with a discharge vessel containing an ionizable filling and in which at least two electrodes are included, wherein at the electrodes, via power supply leads extended to the outside in a gas tight manner, a high-frequency starting voltage $U_{HF}$ and an operating voltage $U_B$ are produced, comprising the steps of:

turning on the high-frequency starting voltage $U_{HF}$ at starting time $t_0$ to ionize the filling and preheat the electrodes, and turning on the operating voltage $U_B$ at time $t_1 = t_0 + \Delta t_H$, after an interval $\Delta t_H$.

2. The method of claim 1, further comprising the step of selecting frequency f of the starting voltage $U_{HF}$ so that the product of the frequency f and the spacing d of the electrodes meets the condition $f \cdot d \geq 50$ kHz·cm.

3. The method of claim 1, further comprising the step of setting the frequency f of the starting voltage $U_{HF}$ in the range between approximately 100 kHz and 200 kHz.

4. The method of claim 1, further comprising the step of setting said interval $\Delta t_H$ to meet the condition $0 < \Delta t_H \leq 3$ sec.

5. The method of claim 4; further comprising the step of setting said interval $\Delta t_H$ to meet the condition $0.1$ sec$< \Delta t_H \leq 1.5$ sec.

6. The method of claim 1, further comprising the steps of turning off the starting voltage $U_{HF}$ at time $t_2$ and setting an overlap time $\Delta t_U = t_2 - t_1$ so that a condition $\Delta t_U \leq 5$ sec applies to the overlap time $\Delta t_U$.

7. The method of claim 6, further comprising the step of setting said overlap time to meet a condition $0.1$ sec$\leq \Delta t_U \leq 0.5$ sec.

8. The method of claim 1, further comprising the step of setting starting voltage $U_{HF}$ and electrode spacing d so that the quotient $U^S_{HF}/d$ of the peak value of the starting voltage, $U^S_{HF}$, and the electrode spacing d meet the following condition: 1 kV/cm$<U^S_{HF}/d<6$ kV/cm.

9. The method of claim 8, wherein the quotient $U^S_{HF}/d$ meets the following condition: 2.5 kV/cm$<U^S_{HF}/d<4.5$ kV/cm.

10. The method of claim 8, wherein the quotient $E^S_{HF}/p = U^S_{HF}/(d \cdot p)$, where p is the fill pressure of the discharge vessel, meets the following condition: 0.1 V/cm·Pa$<E^S_{HF}/p<0.5$ V/cm·Pa.

11. The method of claim 1, further comprising the step of setting the peak value of the starting voltage $U^S_{HF}$ in the range between approximately 1.5 kV and 3.5 kV.

12. The method of claim 11, further comprising the step of setting the value of $U^S_{HF}$ in the range between approximately 2 kV and 3 kV.

13. The method of claim 1, wherein a mean value of the high-frequency starting power is approximately 0.2 to 0.7 times the operating power.

14. The method of claim 13, wherein the mean value of the high-frequency starting power is preferably 0.3 to 0.6 times the operating power.

15. The method of claim 1, further comprising the step of turning off the starting voltage $U_{HF}$ at time $t_2 \geq t_1$ to operate the lamp by only the operating voltage $U_B$.

16. An apparatus for starting and operating a high pressure discharge lamp (EL) with a discharge vessel containing an ionizable filling and in which at least two electrodes are included, comprising:

an HF ignition device (Z), which is connected to a first switch (S1) and provides a high-frequency starting voltage;

an operating device (V), which is connected to a second switch (S2) and provides an operating voltage, and wherein outputs of both the operating device and the HF ignition device (V; Z) are connected to the electrodes of the discharge lamp (EL); and a timer (T) that controls both switches (S1, S2).

17. The apparatus of claim 16, wherein the output of the operating device (V) is connected to the output of the HF ignition device (Z) via a serially connected barrier member (SG), which decouples the outputs from one another for high frequencies.

18. The apparatus of claim 17, wherein the HF ignition device (Z) comprises an HF power oscillator (HF) and a following LC series oscillating circuit (L, C3), and an inductance (L) of said oscillating circuit is serially connected to one of the electrodes of the lamp (EL).

19. The apparatus of claim 18, wherein the barrier member comprises an HF barrier choke (Dr2) connected to the oscillating circuit inductance (L).

20. The apparatus of claim 19, wherein a junction between the HF barrier choke (Dr2) and the oscillating circuit inductance (L) is connected via a coupling capacitor (C2) to the output (7) of the HF power oscillator (HF).

21. The apparatus of claim 19, wherein the first switch (S1) is connected between a first output terminal (4) of the operating device (V) and a first input terminal (6) of the HF ignition device (Z), and the second switch (S2) is connected between a second output terminal (3) of the operating device (V) and the HF barrier choke (Dr).

* * * * *